(12) United States Patent
Zhao

(10) Patent No.: US 12,308,004 B1
(45) Date of Patent: May 20, 2025

(54) MULTIFUNCTIONAL FOLDING GUITAR FOOTSTOOL

(71) Applicant: Maolin Zhao, Shenzhen (CN)

(72) Inventor: Maolin Zhao, Shenzhen (CN)

( * ) Notice: Subject to any disclaimer, the term of this patent is extended or adjusted under 35 U.S.C. 154(b) by 0 days.

(21) Appl. No.: 18/636,676

(22) Filed: Apr. 16, 2024

(30) Foreign Application Priority Data

Nov. 8, 2023 (CN) .......................... 202311479216.6

(51) Int. Cl.
*G10G 5/00* (2006.01)
*A47C 12/00* (2006.01)
*F16M 11/38* (2006.01)

(52) U.S. Cl.
CPC .............. *G10G 5/00* (2013.01); *A47C 12/00* (2013.01); *F16M 11/38* (2013.01)

(58) Field of Classification Search
CPC ...... F16M 11/38; F16M 11/40; A47B 19/002; A47C 12/00; A47C 16/02; G10G 5/00; G10G 5/005
See application file for complete search history.

(56) References Cited

U.S. PATENT DOCUMENTS

| | | | | |
|---|---|---|---|---|
| 70,339 A | * | 10/1867 | Kreitz | A47B 19/06 108/9 |
| 789,813 A | * | 5/1905 | Longley | B60N 2/1803 108/4 |
| 2,299,829 A | * | 10/1942 | Feddersen | G10G 5/00 248/450 |
| 4,228,745 A | * | 10/1980 | Gale | A47C 9/08 248/188.4 |
| 4,943,021 A | * | 7/1990 | Cien | G10G 5/00 248/176.1 |
| 5,078,056 A | * | 1/1992 | McCauley | A47B 3/00 108/115 |
| 5,797,578 A | * | 8/1998 | Graffeo | A47B 23/043 248/456 |
| 5,973,244 A | * | 10/1999 | McCulloch | G10G 5/00 D19/91 |

(Continued)

FOREIGN PATENT DOCUMENTS

| | | | | |
|---|---|---|---|---|
| DE | 202016104286 U1 | * | 9/2016 | ............. A47C 12/00 |
| DE | 202019102572 U1 | * | 6/2019 | ............... G10D 7/10 |

(Continued)

*Primary Examiner* — Patrick D Hawn
(74) *Attorney, Agent, or Firm* — Bay State IP, LLC

(57) ABSTRACT

The present disclosure relates to a multifunctional foldable guitar footstool, which combines the functionality of both a guitar footstool and a guitar holder into a single compact and foldable unit, enhancing usability and adaptability for guitar players. The features include a bracket base and a support arm, which are connected through a bracket connecting plate and can rotate about a bracket rotating shaft, enabling the structure to switch between footstool and holder configurations. The unit includes a footstool support plate, a height adjustment plate, and a neck support plate arranged in the middle of the support arm. These components are designed to rotate about their respective shafts, allowing for easy adjustment and folding, which addresses various user heights and guitar sizes. The footstool enhances stability during use with its anti-skid features and provides versatility through adjustable height settings.

5 Claims, 11 Drawing Sheets

(56) References Cited

U.S. PATENT DOCUMENTS

| | | | | |
|---|---|---|---|---|
| 6,015,121 A * | 1/2000 | Reid | ............ | A47F 7/00 248/152 |
| 6,323,406 B1 * | 11/2001 | Park | ............ | G10G 5/00 84/421 |
| 6,462,260 B2 * | 10/2002 | Fediakov | ............ | G10G 5/00 84/421 |
| 7,208,666 B2 * | 4/2007 | Burch | ............ | G10G 7/005 248/653 |
| 7,364,129 B1 * | 4/2008 | Levari, Jr. | ............ | A47G 23/0216 108/4 |
| 7,777,110 B2 * | 8/2010 | Wallis | ............ | G10G 5/00 248/443 |
| 8,267,477 B1 * | 9/2012 | Appiah Finn | ............ | A47C 16/025 297/423.46 |
| 8,403,419 B2 * | 3/2013 | Damrow | ............ | A47C 16/02 297/423.14 |
| 8,490,942 B1 * | 7/2013 | Henry | ............ | G10G 5/00 248/443 |
| 8,939,872 B2 * | 1/2015 | Sprague | ............ | A63B 21/00047 482/79 |
| 9,010,701 B1 * | 4/2015 | Cooper | ............ | G10G 5/00 84/327 |
| 9,230,524 B2 * | 1/2016 | Cortina | ............ | F16M 11/041 |
| 9,443,496 B1 * | 9/2016 | Chiu | ............ | F16M 11/247 |
| 9,885,443 B2 * | 2/2018 | Max | ............ | G10H 1/32 |
| 10,900,606 B2 * | 1/2021 | Gaines | ............ | G10G 5/00 |
| 12,020,670 B2 * | 6/2024 | Lucksom | ............ | G10G 5/00 |
| 12,137,807 B1 * | 11/2024 | Kumar | ............ | A47C 16/02 |
| 2011/0168863 A1 * | 7/2011 | Tregloan | ............ | G10G 5/00 248/435 |
| 2014/0049088 A1 * | 2/2014 | Appiah Finn | ............ | A47C 16/02 297/423.46 |
| 2021/0264886 A1 * | 8/2021 | Pastreich | ............ | G10G 5/00 |
| 2024/0105150 A1 * | 3/2024 | Mao | ............ | G10G 5/00 |

FOREIGN PATENT DOCUMENTS

| | | | | |
|---|---|---|---|---|
| KR | 20130068183 A | * | 6/2013 | ............ F16M 11/00 |
| KR | 101309117 B1 | * | 9/2013 | ............ G10D 3/00 |
| KR | 200480325 Y1 | * | 5/2016 | ............ G10G 5/00 |

* cited by examiner

MULTIFUNCTIONAL FOLDING GUITAR FOOTSTOOL

TECHNICAL FIELD

The present invention belongs to the technical field of peripheral devices for musical instruments, and particularly relates to a multifunctional foldable guitar footstool.

BACKGROUND OF THE INVENTION

In the playing process or daily maintenance of the guitar, there are usually two common tools. One common tool is a footstool for guitar playing. In the playing process, a foot is placed on the footstool to increase the height of the leg and improve the playing comfort. Particularly in the playing process of a classical guitar, the footstool is one of the accessories that must be used. The other required common tool is a guitar holder. When it is necessary to replace the guitar string or maintain the guitar, the guitar holder can support the guitar neck, and the guitar can be steadily paid on the table, thus improving the convenience of operation. The guitar footstool and the guitar holder in the prior art have single functions and are large in size. Moreover, the guitar holder cannot be adjusted in height, cannot adapt to guitars with different sizes when in use, cannot be folded and are inconvenient to carry. In view of the above problems, the present invention provides a multifunctional foldable guitar footstool.

SUMMARY OF THE INVENTION

In view of the shortcoming that the guitar footstool and the guitar holder in the prior art have single functions and are inconvenient to use, an objective of the present invention is to a provide a multifunctional foldable guitar footstool (also referred to as a guitar footstool), which is redesigned in combination with the daily usage scenario of a guitar and integrates a guitar footstool and a guitar holder.

The guitar footstool is mainly characterized in that the guitar footstool can realize a guitar footstool function and a guitar holder function through the cooperation of different components, and the height of the bracket can be adjusted by cooperating the height adjustment plate with the height adjustment grooves on the footstool, thus adapting to players with different heights and guitars with different sizes. In addition, the components of the guitar footstool can be folded by rotation, and thus are convenient for a user to carry.

In order to achieve the above objective, the present invention employs the following technical solution. A bracket base and a support arm are arranged on the guitar footstool, and are connected through a bracket connecting plate. A bracket rotating shaft is arranged on the bracket connecting plate, and the bracket base and the support arm can be rotated about the bracket rotating shaft.

A footstool support plate, a height adjustment plate and a neck support plate are arranged in the middle of the support arm. The footstool support plate is used for supporting when the footstool function is used. The height adjustment plate is used to adjust the guitar footstool and the guitar holder through the cooperation with the height adjustment grooves on the bracket base. The neck support plate is used to support the neck of the guitar when the guitar holder function is used. The support arm, the height adjustment plate and the neck support plate of the footstool can be rotated about respective rotating shafts, and can be unfolded or folded according to different functions when in use.

The bracket base and the support arm can be placed on a plane downward. When the bracket base is placed facing downward, the guitar holder function can be realized through the cooperation of components. When the guitar support arm is placed facing downward, the guitar footstool function can be realized through the cooperation of components. The support bracket and the support arm can be folded through the bracket connecting plate and the bracket moving shaft. Moreover, the footstool support plate, the height adjustment plate and the neck support plate have a total length of less than or equal to the length of the support arm, and can be rotated and folded about the respective rotating shafts and thus can be better hidden in the middle region of the support arm.

The present invention has the following technical effects. 1. The guitar footstool can realize the dual functions of a guitar footstool and a guitar holder. 2. When it is used as a guitar footstool and a guitar holder, the height can be adjusted. 3. The guitar footstool can be folded, and is convenient to carry and small in floor space.

BRIEF DESCRIPTION OF THE DRAWINGS

FIGS. 9 and 10 are stereoscopic diagrams of folding the guitar footstool; and FIG. 11 is a rear view of the guitar footstool after folded; in which:

1: bracket base; 2: support arm; 3: footstool support plate; 4: height adjustment plate; 5: neck support plate; 6: neck limiting groove; 7: height adjustment groove; 8: neck support plate rotating shaft; 9: height adjustment plate rotating shaft; 10: footstool support plate rotating shaft; 11: bracket rotating shaft; 12: pedal antiskid groove; and, bracket connecting plate.

DETAILED DESCRIPTION

The present invention will be described below in details with reference to the accompanying drawings. This description is not limiting, but the actual implementations are not limited thereto. If those skilled in the art are inspired, without departing from the creative aim of the present invention, all structural modes and embodiments similar to this technical solution designed without paying any creative effort shall fall into the protection scope of the present invention.

Figure 1:
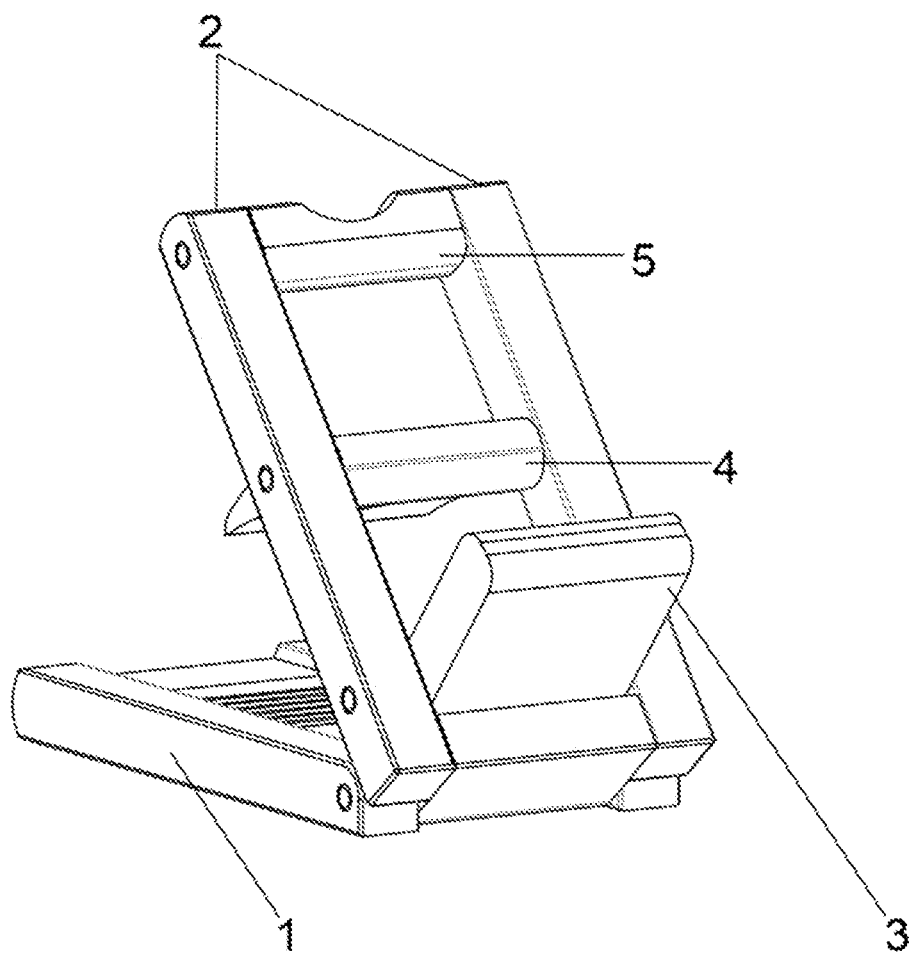
FIGS. 1, 2 and 3 are explanatory diagrams of component names of the guitar footstool.
Figure 2:
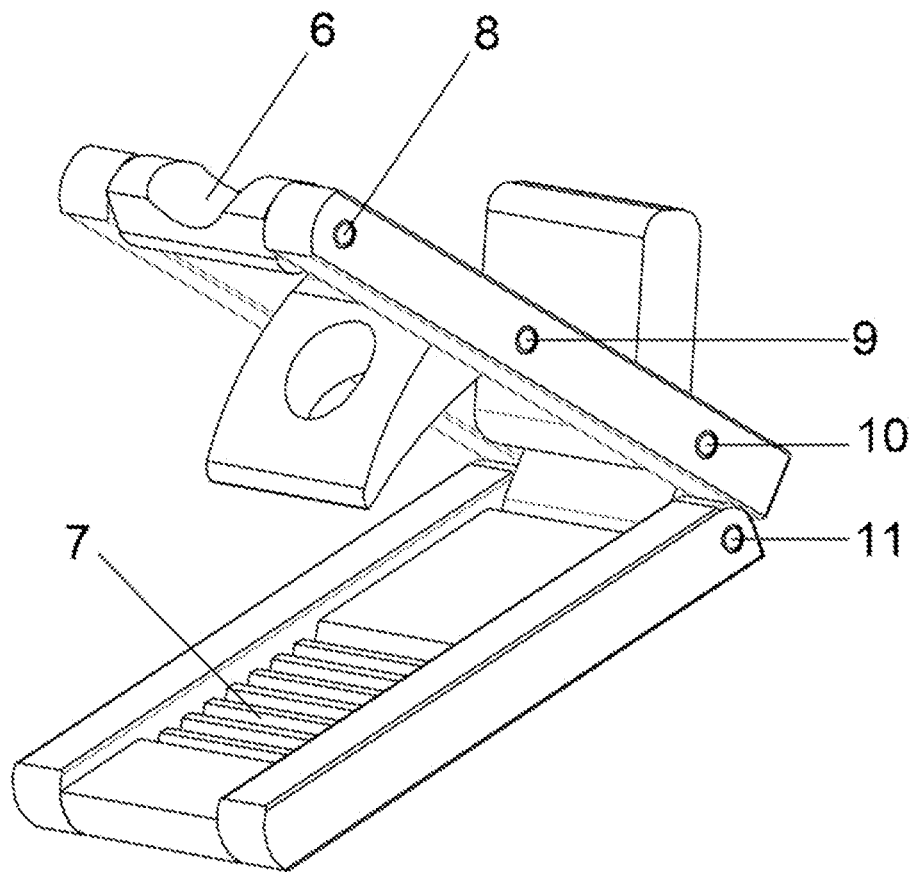
Figure 3:
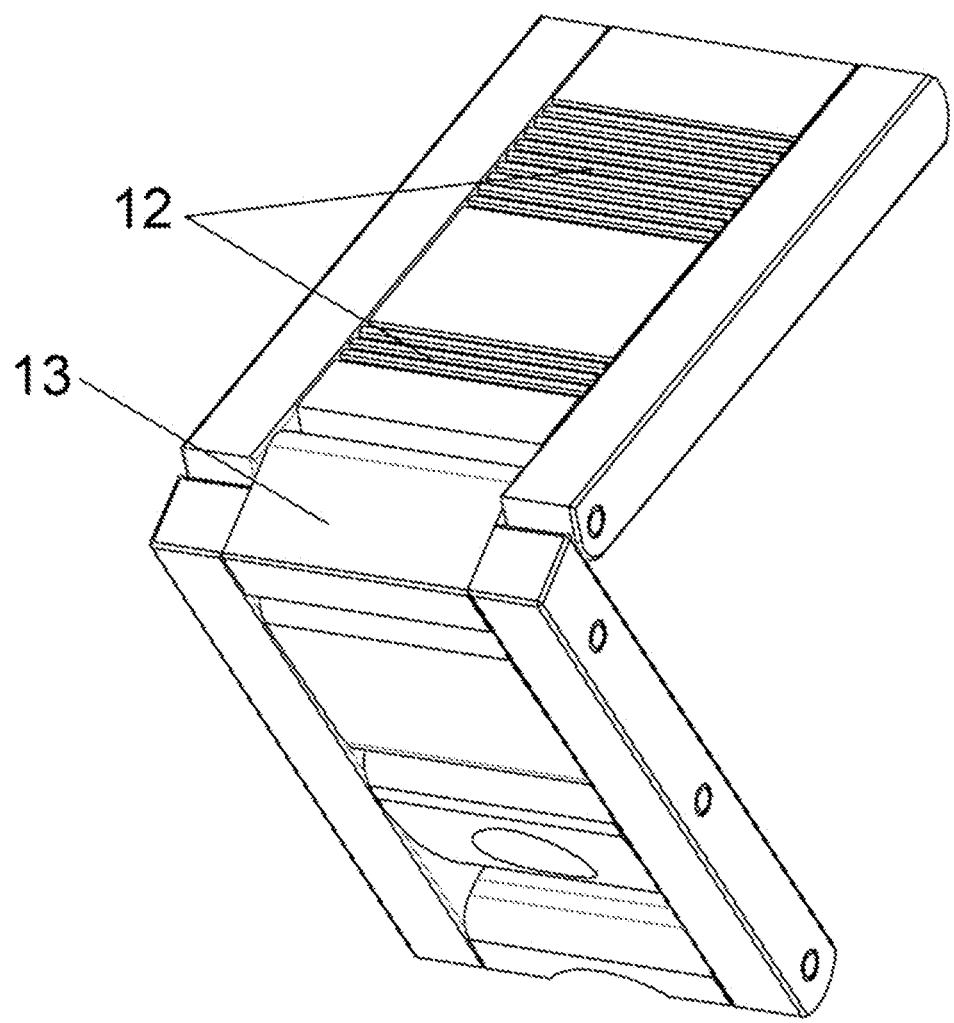

Embodiment 1: As shown in FIGS. 1, 2 and 3, a bracket base 1 and a support arm 2 of the guitar footstool are connected through a bracket connecting plate 13, and a bracket rotating shaft 11 is arranged on the bracket connecting plate 13. The bracket base 1 and the support arm 2 can be rotated about the bracket rotating shaft 11. A footstool support plate 3, a height adjustment plate 4 and a neck support plate 5 are arranged in the middle of the support arm 2. The footstool support plate 3, the height adjustment plate 4 and the neck support plate 5 can be rotated about the respective rotating shafts. They are unfolded or folded according to different functions when in use.

Figure 4:
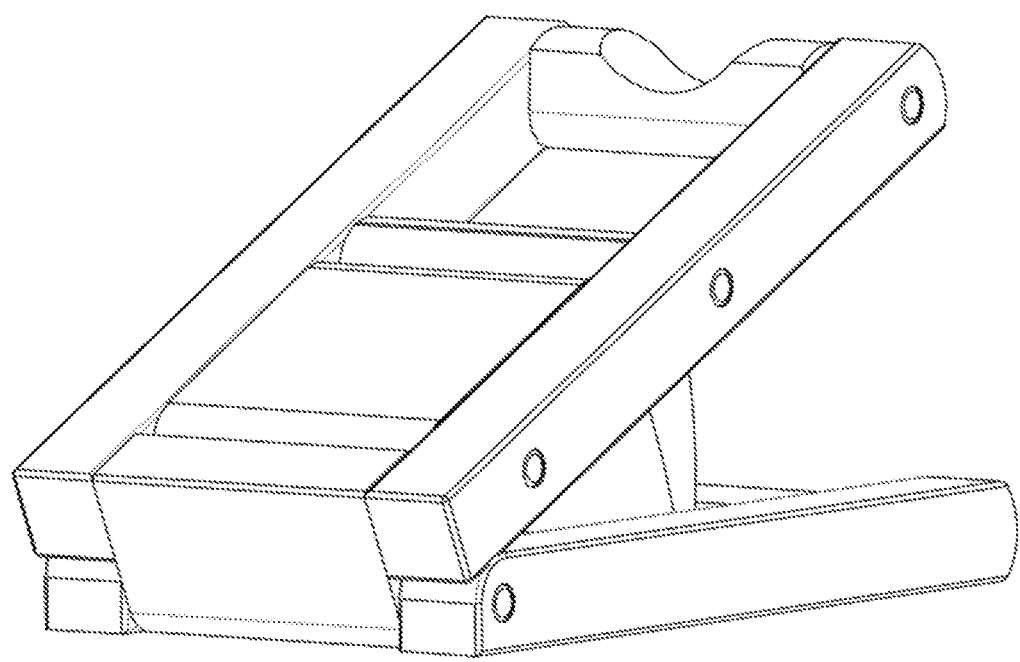
FIGS. 4 and 5 are stereoscopic diagrams of the guitar holder function.
Figure 5:
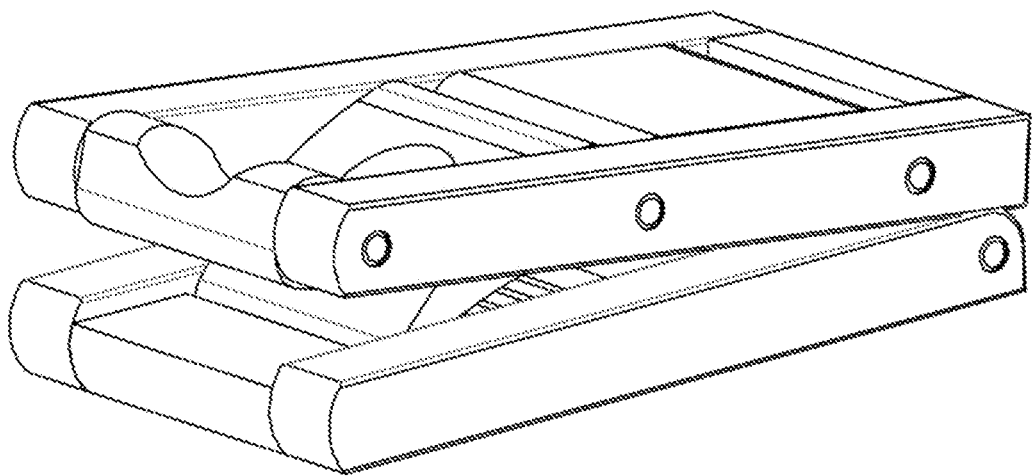
Figure 6:
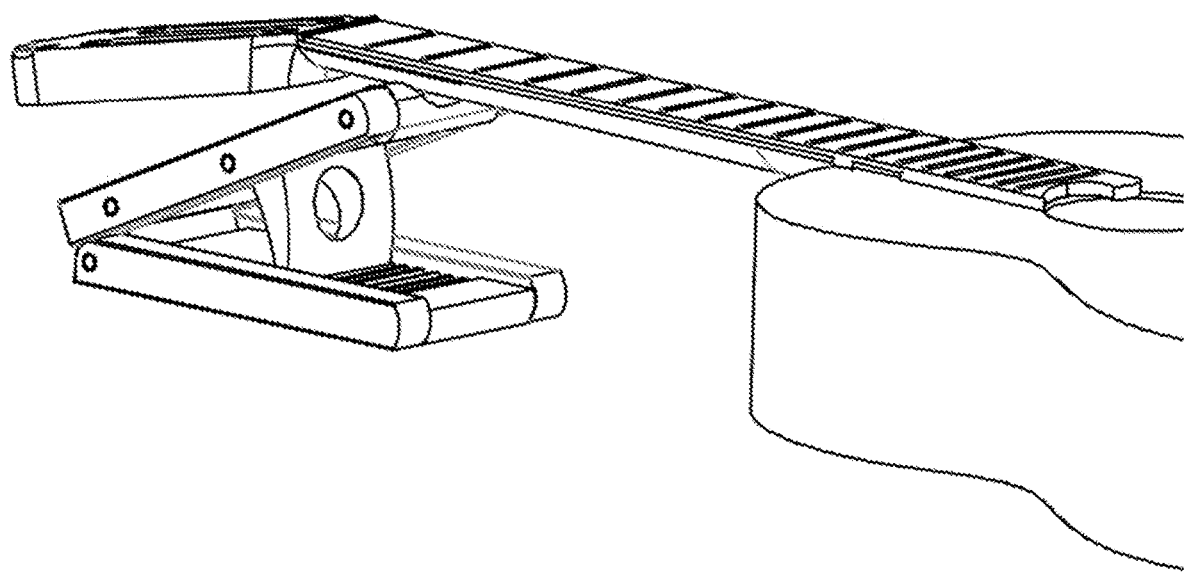
FIG. 6 is a schematic diagram of the guitar holder function.

Embodiment 2: As shown in FIGS. 4, 5 and 6, one surface of the bracket base 1 of the guitar footstool faces downward, the support arm 2 is unfolded about the bracket rotating shaft 11, and the height adjustment plate 4 is clamped into the height adjustment grooves 7 on the bracket base 1. Moreover, the neck limiting groove 6 on the neck support plate 5 is rotated to a horizontal state. At this time, the guitar can be laid flat, and the neck is placed on the neck limiting groove 6 on the neck support plate 5. This guitar footstool can realize the guitar holder function.

Figure 7:
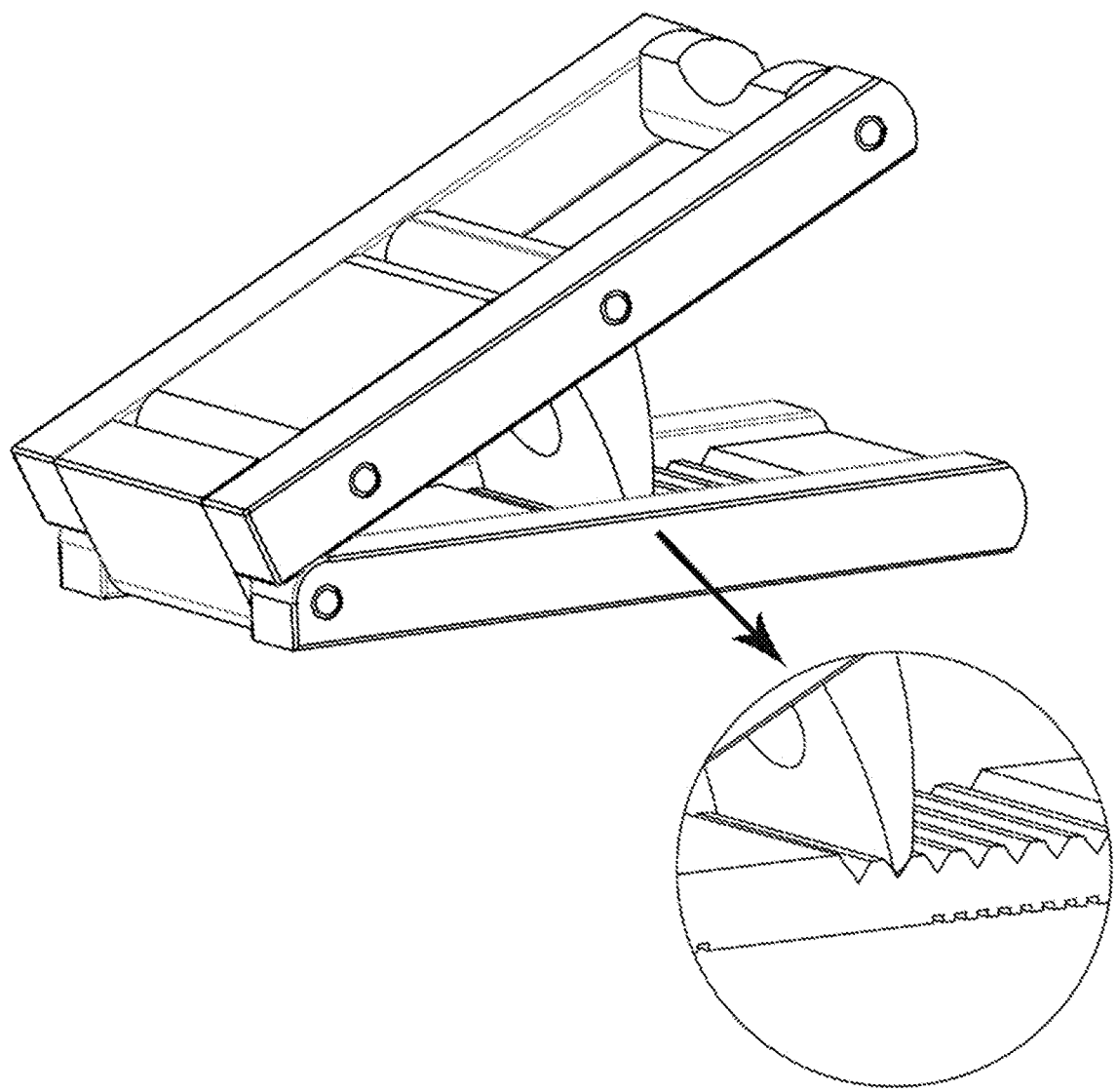
FIG. 7 is a schematic diagram of the cooperation of the height adjustment plate and the height adjustment groove.

Embodiment 3: As shown in FIG. 7, a plurality of height adjustment grooves 7 are formed on one surface of the bracket base 1 of the guitar footstool. By clamping the height adjustment plate 4 into the height adjustment grooves 1, the bracket base (1) and the support arm (2) can be fixed. Moreover, by clamping the height adjustment plate 4 into the height adjustment grooves 7 at different positions, the unfolding distance between the bracket base (1) and the support arm (2) can be changed. Regardless of the guitar footstool function or the guitar holder function, the change of the height and the fixation of the bracket can be realized through the cooperation of the height adjustment plate 4 with the height adjustment grooves 7.

Figure 8:
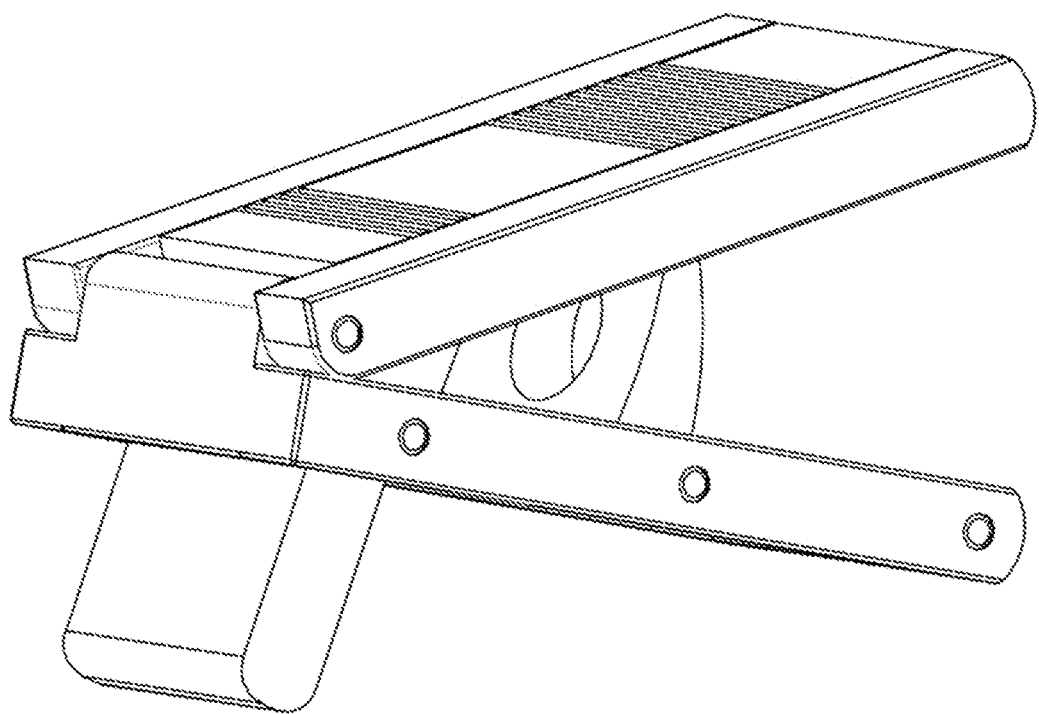
FIGS. 8 and 9 are stereoscopic diagrams of the guitar footstool function.
Figure 9:
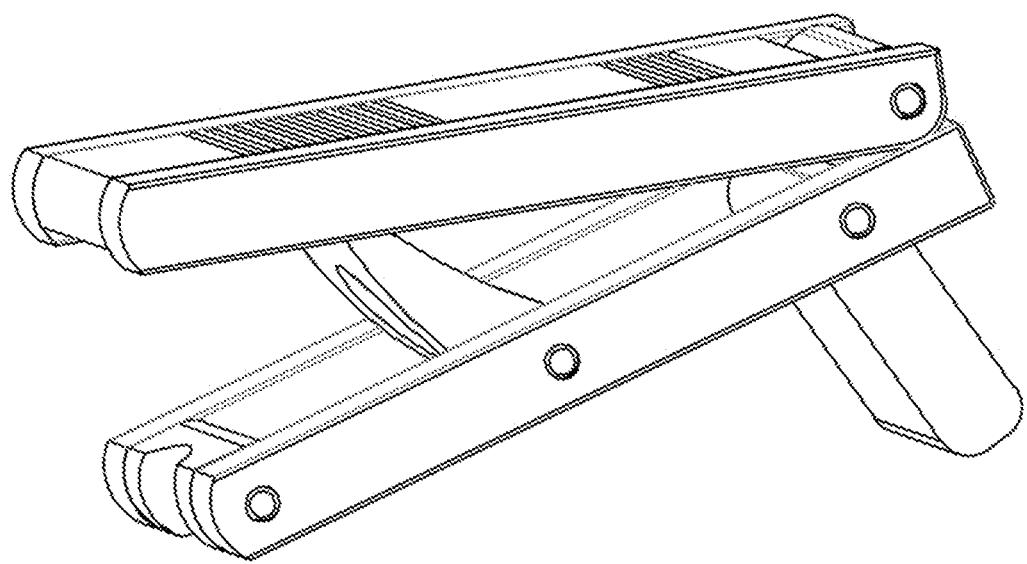

Embodiment 4: As shown in FIGS. 8 and 9, the support arm 2 of the guitar footstool is placed facing downward, the footstool support plate 3 is rotated about the footstool support plate rotating shaft 10, one surface of the footstool support plate 3 is resisted against the bracket connecting plate 13, and the height adjustment plat 4 is clamped into the height adjustment grooves 7. The guitar footstool can realize the guitar footstool function. A footstool antiskid groove 12 is arranged on one surface of the support bracket 1 to increase the friction between the sole and the footstool. The height of the footstool can be changed by making the height adjustment plate 4 cooperate with the height adjustment grooves 7.

Figure 10:
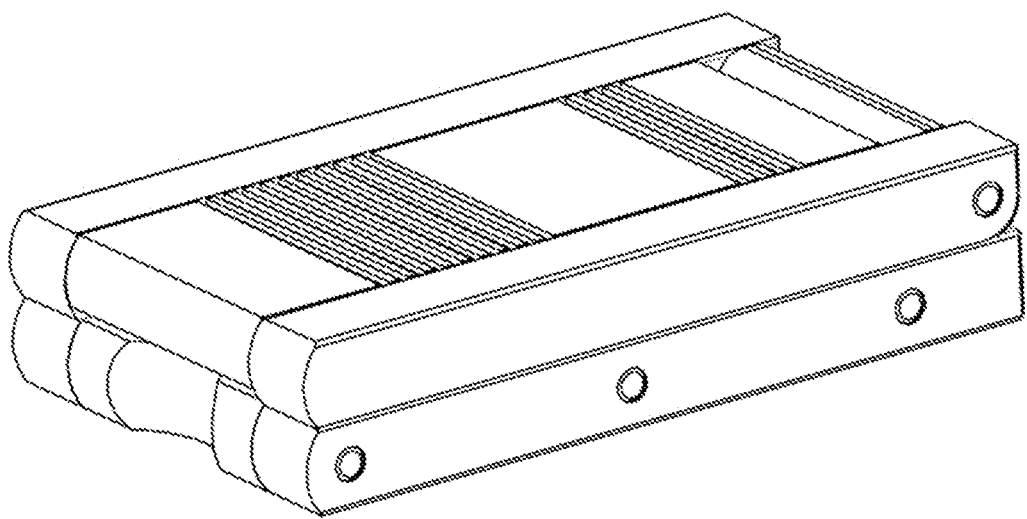
Figure 11:
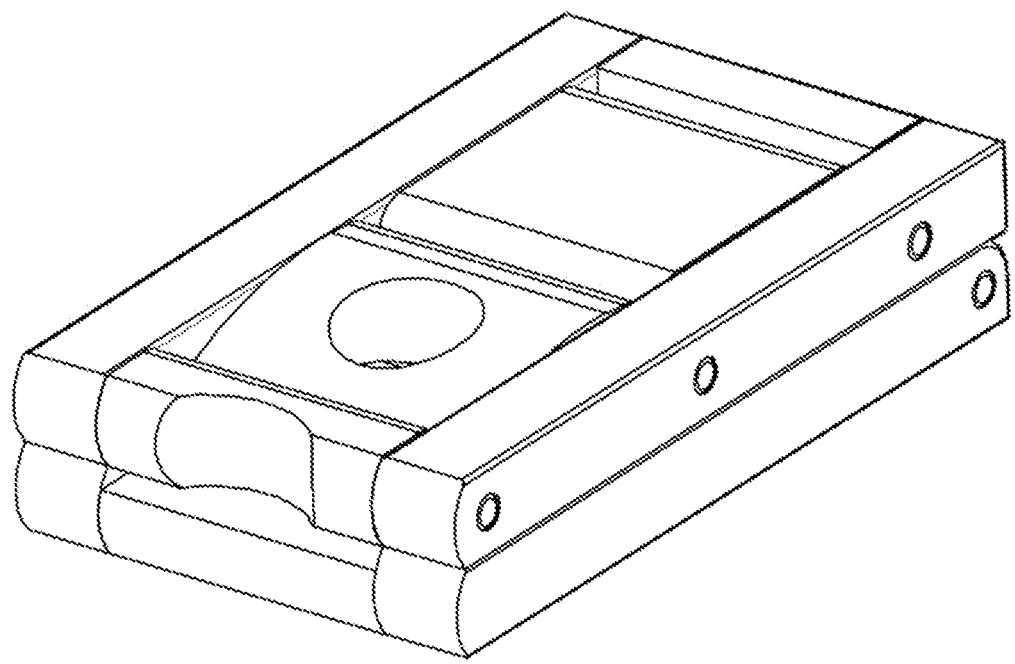

Embodiment 5: As shown in FIGS. 10 and 11, the footstool support plate 3, the height adjustment plate 4 and the neck support plate 5 in the middle of the support arm 2 of the guitar footstool are rotated about the respective rotating shafts, and can be folded in the middle region of the support arm 2. Moreover, the support arm 2 and the support bracket 1 can be rotated about the bracket rotating shaft 11, so that the footstool bracket is folded.

What is claimed is:

1. A multifunctional foldable guitar footstool, wherein:
a bracket base (1) and a support arm (2) are assembled together through a bracket connecting plate (13); a bracket rotating shaft (11) is arranged in the bracket connecting plate (11); the bracket base (1) and the support arm (2) can be rotated about the bracket rotating shaft (11); a footstool support plate (3), a height adjustment plate (4) and a neck support plate (5) are arranged in a middle region of the support arm (2); the footstool support plate (3) is assembled with the support arm (2) through a footstool support plate rotating shaft (10), and can be rotated about the footstool support plate rotating shaft (10); the height adjustment plate (4) is assembled with the support arm (2) through a height adjustment plate rotating shaft (9), and can be rotated about the height adjustment plate rotating shaft (9); the neck support plate (5) is assembled with the support arm (2) through a neck support plate rotating shaft (8), and is rotated about the neck support plate rotating shaft (8); a neck limiting groove (6) is formed at one end of the neck support plate (5); and, a plurality of height adjustment grooves (7) are formed on one surface of the bracket base (1), while a pedal antiskid groove (12) is formed on the other surface thereof.

2. The multifunctional foldable guitar footstool according to claim 1, wherein the height adjustment plate (4) can be clamped into the height adjustment grooves (7) to limit the fixed support arm (2) and the bracket base (1); and, the height adjustment plate (4) can be clamped into the height adjustment grooves (7) at different positions to change the unfolding distance between the support arm (2) and the bracket base (1).

3. The multifunctional foldable guitar footstool according to claim 1, wherein the support arm (2) is placed facing downward; the bracket base (1) is unfolded about the bracket rotating shaft (11); the footstool support plate (3) is rotated about the footstool support plate rotating shaft (10), and its one surface is resisted against the bracket connecting plate (13) to limit the footstool support plate (3) so as to prevent the free rotation of the footstool support plate (3); and, the height adjustment plate (4) can be clamped into the height adjustment grooves (7), so that a guitar footstool function can be realized.

4. The multifunctional foldable guitar footstool according to claim 1, wherein the bracket base (1) is placed facing downward; the support arm (2) is unfolded about the bracket rotating shaft (11); the height adjustment plate (4) can be clamped into the height adjustment grooves (7); and, the neck limiting groove (6) on the neck support plate (5) is rotated to a horizontal state, so that a guitar holder function can be realized.

5. The multifunctional foldable guitar footstool according to claim 1, wherein the footstool support plate (3), the height adjustment plate (4) and the neck support plate (5) in a folded state have a total length of less than or equal to the length of the support arm (2), and thus can be rotated and folded inside the support arm (2); and, when the height adjustment plate (4) is moved from the height adjustment grooves (7) and the footstool support plate (3), the height adjustment plate (4) and the neck support plate (5) are rotated and folded inside the support arm (2), the bracket base (1) and the support arm (2) can be folded.

\* \* \* \* \*